United States Patent [19]

Tuss

[11] Patent Number: 4,503,614
[45] Date of Patent: Mar. 12, 1985

[54] COORDINATE MEASURING MACHINE HAVING VERTICAL FINE FEED AND LOCK MECHANISM

[75] Inventor: John J. Tuss, Englewood, Ohio
[73] Assignee: The Warner & Swasey Company, Cleveland, Ohio
[21] Appl. No.: 464,245
[22] Filed: Feb. 7, 1983
[51] Int. Cl.³ ............................................. G01B 5/02
[52] U.S. Cl. .................................. 33/1 M; 33/143 K; 33/169 R; 33/165; 33/DIG. 1; 74/89; 74/210
[58] Field of Search ............... 33/1 M, 169 R, 169 B, 33/172 R, 172 E, 165, 143 K, DIG. 1, 172 B, 170, 171, 189, 125 M; 74/210, 207, 89

[56] References Cited

U.S. PATENT DOCUMENTS

| | | | |
|---|---|---|---|
| 1,246,426 | 11/1917 | Herman | 74/210 |
| 1,249,174 | 12/1917 | Murry | 74/210 X |
| 2,551,671 | 5/1951 | Harris | 33/143 K X |
| 4,438,569 | 3/1984 | Weglin | 33/1 M |

FOREIGN PATENT DOCUMENTS

| | | | |
|---|---|---|---|
| 690020 | 4/1965 | Italy | 33/143 K |
| 2042732 | 9/1980 | United Kingdom | 33/169 R |

Primary Examiner—William D. Martin, Jr.
Attorney, Agent, or Firm—Kenneth A. Seaman; Raymond J. Eifler

[57] ABSTRACT

A coordinate measuring machine having a vertically movable probe shaft in which a vertical fine feed and lock mechanism for the probe shaft is provided by a first knob coupled to a magnet movable between two positions, one of said positions operatively coupling a second knob to the probe shaft for driving said probe shaft in a vertical direction, the other of said positions being ineffective for moving the fine feed mechanism. The fine feed is accomplished through the rotation of a second knob which is in frictional engagement through a driven quasi "V" shaped flanged wheel with the probe shaft to be moved vertically.

12 Claims, 4 Drawing Figures

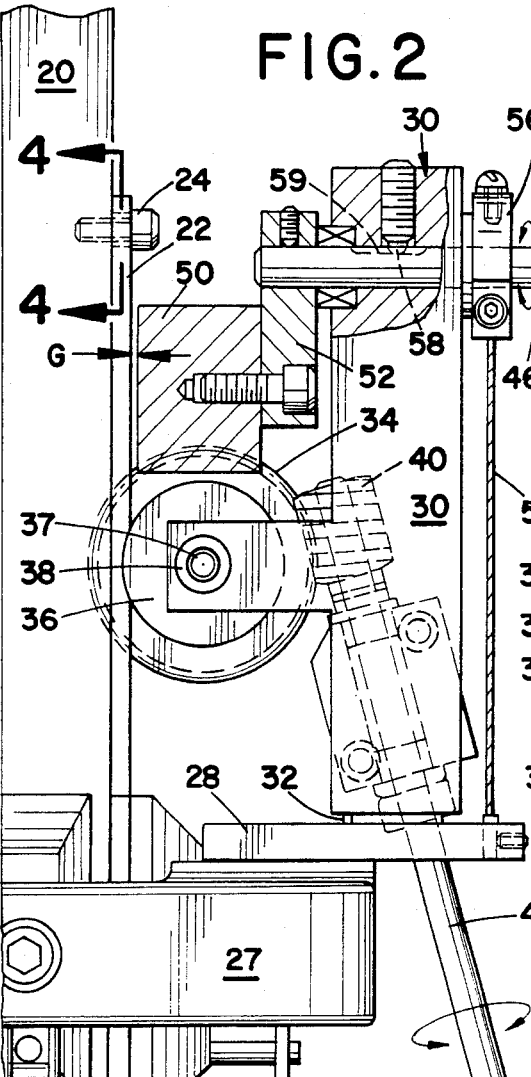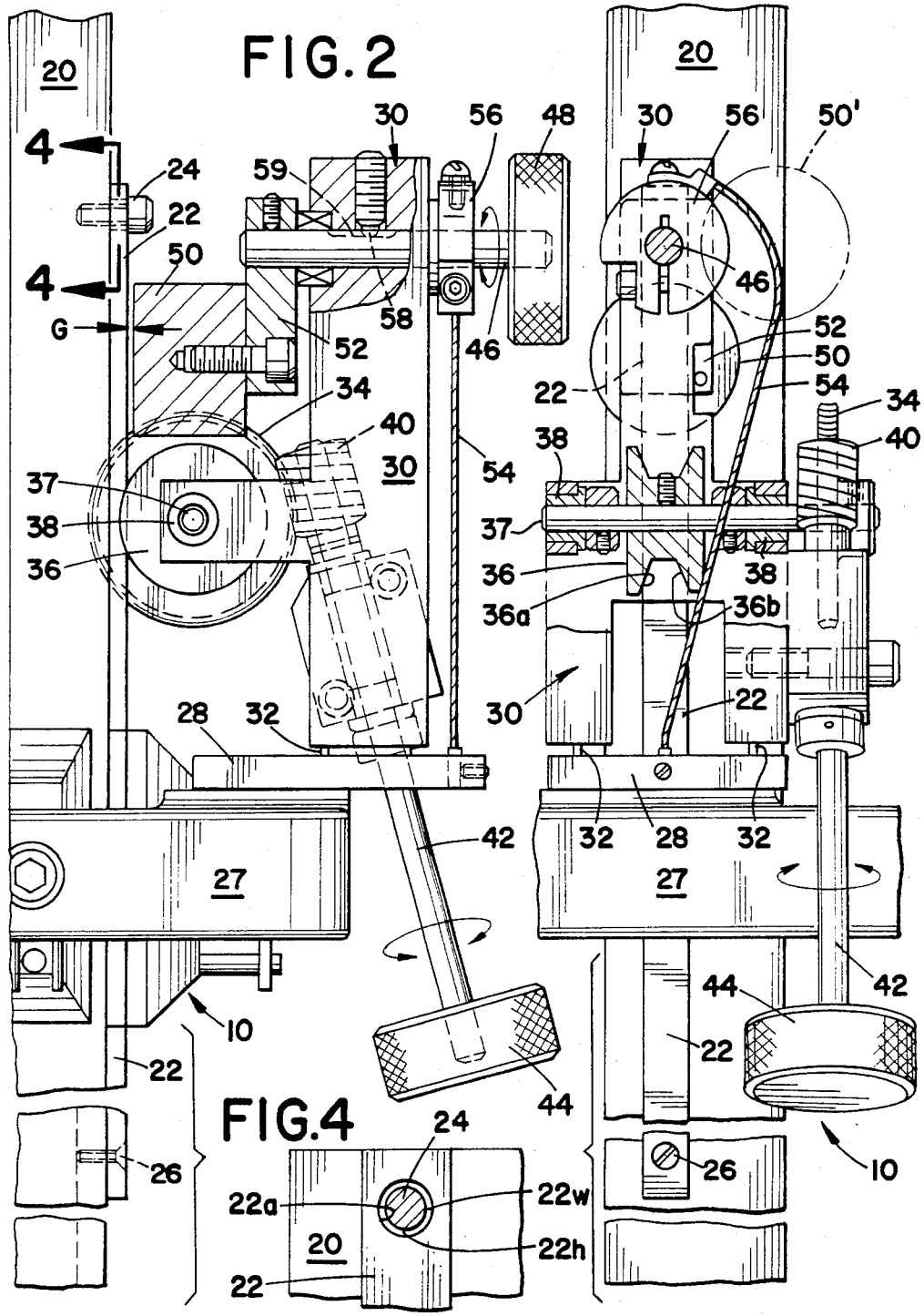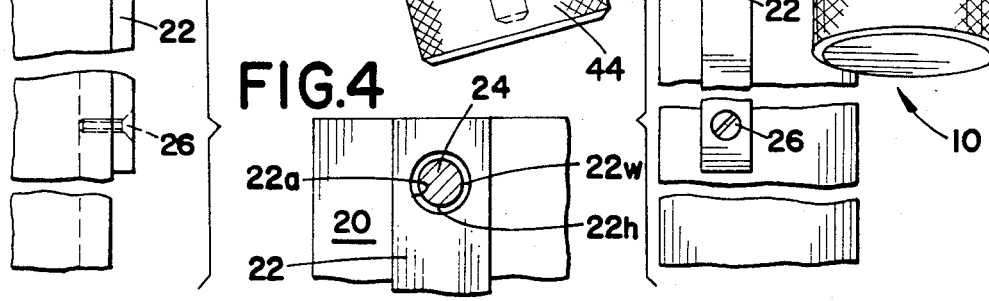

COORDINATE MEASURING MACHINE HAVING VERTICAL FINE FEED AND LOCK MECHANISM

BACKGROUND OF THE INVENTION

1. Technical Field

The present invention relates to a coordinate measuring machine having a vertically suspended probe which is movable vertically to engage and measure a part. The apparatus disclosed in this invention is a vertical motion lock and fine feed which may have use in other systems in which a light weight, accurately positioned member is to be moved precisely without backlash, yet with minimal inertial or other forces.

2. Background Art

Many coordinate measuring machines are known. Typically, such machines include a horizontally movable carriage including a vertical probe shaft and probe suspended from a cantilevered arm or bridge mechanism. The vertically suspended probe shaft is counterbalanced to be easily movable upward or downward as necessary to allow the probe to engage a part therebelow and allow a measurement of features on such part.

In such coordinate measuring machines, precise incremental vertical movement of the shaft is desirable with little or no backlash and with as little influence as possible on the position of the probe, its relationship to guide bearings and on the probe shaft geometry itself. Accordingly, it is desirable to have a fine feed mechanism which applies a minimum amount of force and torque consistent with desired movement and minimal backlash movement of either the probe shaft or the control mechanism without concurrent movement of the other.

Additionally, it is desirable to have a mechanism for selectively coupling and decoupling the probe shaft movement apparatus from the probe shaft as desired.

The prior art coordinate measuring machines do not have a suitable lock and fine feed mechanism for the vertical direction. The prior art has suggested several lock and fine feed mechanisms which are appropriate and highly desirable for horizontal movement of the carriage and a cantilever arm or bridge assembly, but such systems are not readily adaptable to a vertically suspended probe and the vertical movement thereof. The delicate balance between a counterbalance system and the force of gravity, together with rather delicate and high accuracy guide bearings and critical shaft geometry, with the concurrent requirements for high stiffness, low weight and a rigid structure, make a vertical fine feed and lock mechanism for a coordinate measuring machine difficult to attain.

Since many coordinate measuring machines are designed for use in an automatic mode wherein servo motors provide a controlled drive of the mechanical structure independent of human operators, a measuring machine advantageously should include a system for releasably moving the components in each of the desired directions, preferably including a fine feed for precise positioning in each direction.

U.S. Pat. No. 3,403,448 to W. F. Aller and owned by the assignee of the present invention illustrates generally a prior art cantilevered arm coordinate measuring machine having a vertically suspended probe shaft which is movable in the vertical direction by the operator's grasping the shaft and "man-handling" it into the desired position. U.S. Pat. No. 3,774,311 to Stemple illustrates a bearing structure for movably mounting the probe for vertical movement with pairs of spool-type bearings providing guides for vertical movement of the probe along a generally predetermined path.

U.S. Pat. No. 3,817,111 illustrates a lock and fine feed mechanism for a coordinate measuring machine to effect or prevent movement in a generally horizontal plane. In such a system, a remote knob controls gripping of a threaded rod by a carriage mounted member which, when rotated while the rod is gripped, effects horizontal movement of the carriage with respect to a base.

U.S. Pat. No. 3,818,596 to Stemple and Allen discloses a variable torque magnetic particle clutch mechanically coupled to counterbalance and drive a probe vertically.

U.S. Pat. No. 4,207,680 to Bell and Tuss discloses an air counterbalance system for a vertical probe coordinate measuring machine in which an air cylinder is mechanically coupled to support a vertical probe which is mechanically moveable by an operator's directly grasping the probe and moving it.

U.S. Pat. No. 4,213,244 to Bell and Tuss also discloses a failsafe system for vertically mounted probes, in which movable brake members are mounted adjacent to the probe shaft and selectively engage the shaft to prevent its downward motion, e.g., if the counterbalance fails or the downward speed exceeds a predetermined rate.

Accordingly, the prior art coordinate measuring machines lack a vertical fine feed and lock mechanism for probe movement without imposing undesirable forces on the shaft or its mounting system.

DISCLOSURE OF THE INVENTION

The present invention overcomes the limitations and disadvantages of the prior art systems by providing a coordinate measuring machine with a vertical fine feed and lock mechanism characterized in that the lock mechanism includes a magnet movable between two positions, one position providing an attractive force with the probe shaft to bring a drive member into driving engagement with the probe shaft, with the other position having the magnet positioned away from the probe shaft, and releasing the drive from the probe shaft. The magnet positioning provides a "lock" function wherein one position couples the shaft in driving relationship to the probe. Accordingly, the fine feed mechanism is operable to move the probe shaft in a vertical direction only when the magnet is positioned adjacent to a drive strip connected to the probe shaft. The fine feed is accomplished by a flanged wheel having converging (V-shape) surfaces engaging a drive strip carried on the probe shaft in driving relationship.

The present invention is a vertical axis lock and feed mechanism which has a minimal amount of weight and exerts a minimal amount of force on the probe shaft and provides a reduced inertia on the moving members.

The present invention also is characterized by a magnet which controllably positions an operable drive mechanism to couple a fine feed mechanism to a probe shaft to allow the controlled movement of the probe shaft in response to rotation of a knob. The magnet is also suitably controlled by a locking device to move to a second position whereat it decouples the fine feed mechanism from a probe shaft, allowing either to move independent of the other, with the probe shaft independent of the fine feed knob and shaft.

The present invention also has the advantageous effect that the vertical fine feed mechanism and drive strip associated therewith are adjustable coupled to the measuring machine. The drive strip is loosely coupled at one end thereof to allow it to move a limited amount laterally. By such lateral movability, the drive strip need not be assembled precisely in position or in corresponding orientation determined by the fine feed mechanism, and need not be assembled exactly straight, yet, the fine feed flange can follow the drive strip in driving relationship nevertheless.

The foregoing and other objects and advantages of the present invention will be apparent to one skilled in the art in view of the following detailed description of the best mode for carrying out the invention and the appended claims, taken in conjunction with the accompanying drawings.

BRIEF DESCRIPTION OF THE DRAWINGS

FIG. 2 is an enlarged partial front view (partially cut away) showing particularly the vertical fine feed and lock mechanism associated with the coordinate measuring machine of FIG. 1.

FIG. 3 is a partial right side view of the lock and fine feed mechanism of FIG. 2.

FIG. 4 is a detailed view of a position of FIG. 2, taken along the line 4—4, looking in the direction of the arrows.

BEST MODE FOR CARRYING OUT THE INVENTION

Figure 1:
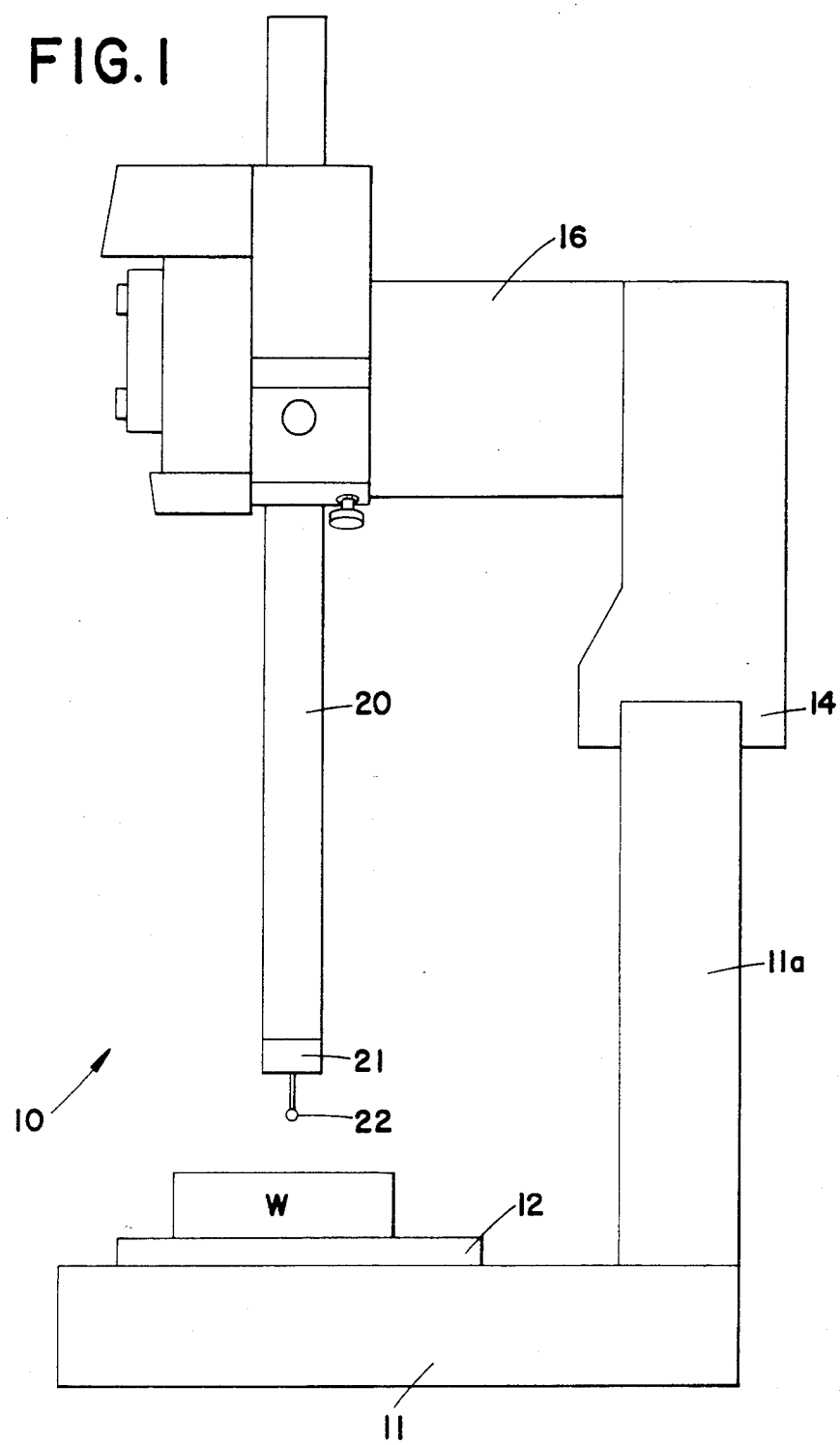
FIG. 1 is a right side view of a coordinate measuring machine of the present invention includng a vertical lock and fine feed mechanism.

FIG. 1 is a right side view of a coordinate measuring machine 10 of the present invention. The coordinate measuring machine 10 includes a base 11 with a table 12 for supporting a workpiece W to be inspected, a carriage 14 and a cantilevered arm 16 movably mounted to an upright portion 11a mounted to the base 11. The cantilevered arm 16, carrying a vertically movable probe shaft 20 is manufactured and assembled generally in accordance with prior art coordinate measuring machines, an example which is shown in U.S. Pat. No. 3,774,311 to Stemple and assigned to the assignee of the present invention. The probe shaft 20 carries a probe 21 having a probe tip 23 for engaging the workpiece W and is counterbalanced in a known manner.

The probe shaft 20 is vertically movable with respect to the cantilevered arm 16 and the carriage 14, and the probe shaft 20 can move horizontally along the cantilevered arm 16. The carriage 14 is horizontally movable with respect to the base 11 to allow inspection of the workpiece by taking coordinate measurements at various locations representative of, for example, selected features of the workpiece W to be inspected. Suitable gratings and measurement scales are not shown but are associated with each of the independent axes of movement of the coordinate measuring machine to provide a means for measuring these features. Such gratings and distance measuring devices are not shown in this application, as they are well known in the coordinate measuring machine field and of conventional design which is not particularly relevant to the present invention.

The probe shaft 20 is mounted to the cantilevered arm 16 and the carriage 14 is mounted to the upright portion 11a of the base 11 by suitable conventional bearings, also not shown, in view of their conventional design. However, the bearings are manufactured and positioned to allow a precise rectilinear motion in each of the three directions which are mutually orthogonal to preserve the independence of one directional dimension with regard to the other.

Also not shown, but well known within the coordinate measuring machine industry, is the construction and operation of the probe 21 mounted at the lower approximate end of the probe shaft for engaging the workpiece W. Different types of probes are well known in the industry and could be used to advantage in the present apparatus, all independent of the present invention. The probe 21 is advantageously chosen based upon the type of workpiece to be inspected and the characteristics of the feature of which the measurements are being taken.

FIG. 2 is an enlarged front view (partially cut away) of a portion of the coordinate measuring machine 10 of the present invention, including the probe shaft 20. The probe shaft 20 has a drive strip 22 extending along the length thereof mounted by suitable screws 24,26. The screw is a shoulder screw whose function is described in greater detail in connection with FIG. 4. The drive strip 22 is constructed of a suitable ferromagnetic material, such as steel, for purposes as will hereinafter be made clear.

Also mounted to the coordinate measuring machine 10 is a probe shaft guide bearing housing 27. The housing 27 is fixed to the carriage and provides the low friction precision mounting for the vertical movement of the probe shaft 20. Coupled to the probe shaft guide bearing housing 27 is an adjustable support plate 28. The adjustable support plate 28 has a pivotable T-shaped retaining body 30 mounted thereto by a pair of flexures 32, only one of which is shown in this view, as the other flexure is positioned behind the one shown. The flexures 32 allow the entire retaining body 30 to pivot with respect to the support plate 28.

The T-shaped retaining body 30 carries a worm gear 34 operatively connected to a drive roll 36. The drive roll 36 and worm gear 34 are mounted to the retaining body 30 by a shaft 37 and bearings 38, with the worm gear 34 and the drive roll 36 coupled to rotate together. A worm assembly 40 is also mounted to the retaining body 30 and is coupled to a shaft 42 and a "feed" knob 44. As the feed knob 44 is rotated, the shaft 42 rotates, together with the worm assembly 40, driving the worm gear 34 in rotation along with the drive roll 36.

The retaining body 30 also supports a magnet pivot shaft 46 having a "lock" knob handle 48 and a ferromagnetic member comprised of a permanent magnet 50 mounted by an arm 52 to be off center from the shaft 46. The arm 52 and the magnet 50 rotate with the shaft 46 and the knob 48. A retract cable 54 is coupled to the magnet pivot shaft 46 by a collar 56 carried on the shaft 46 and thereby exerts a return force on the magnet pivot shaft 46, the lock knob 48 and the magnet 50 when the lock knob 48 is not otherwise being acted upon, as by an operator rotating it. Two relatively stable rotational positions of the shaft 46 (fully against fine feed, and fully coupled for fine feed) are defined by a detent ball 55 operating on a flat surface 59 of the shaft 46.

The magnet 50 is spaced from the drive strip 22 by a small air gap G. The positioning of the adjustable plate 28 with respect to the housing 27 allows adjustment of the air gap G (and hence the magnetic "pull".)

FIG. 3 is a side view, partially sectioned, showing the feed knob 44 operating the drive roll 36 through the worm gear and the bearings 38 mounting the drive roll 36 to the retaining body 30, all as described in connection with FIG. 2.

The drive roll 36 includes converging "v" flanges 36a, 36b converging internal surfaces suitable for engaging the drive strip 22 on the probe shaft in driving relationship. The effective engagement force between the drive roll 36 and the drive strip 22 is a function of the gap G and the strength of the magnet 50 determining the magnetic attraction force and the angle of incline of the converging "V". For any one magnet "pull" value driving grip is determined by the angle of the "V" flanges.

The permanent magnet 50 is shown in solid lines in its first position corresponding to the position shown in FIG. 2. In this first position, the drive roll 36 is urged into position for engaging the drive strip 22. The positioning of the drive roll 36 in driving relationship is caused by the magnet attraction between the magnet 50 and the drive strip 22, transmitted through the body 30, the shaft 37 and the shaft 46.

A second position of the magnet is shown by phantom lines and a reference numeral 50', away from the drive strip 22, at which it allows the body 30 and drive roll 36 to be yieldable, retracted by the retract cable 54 and avoid a driving force between the feed knob 44 and the drive strip 22. This is a so-called "unlocked" position with the feed knob 44 decoupled from the probe shaft 20.

The lock knob has been removed to show details of the assembly in FIG. 3, but is mounted on the shaft 46, which mounts the block 56 to the retract cable 54. The other end of the retract cable 54 is secured to the support plate 28, so that when the lock knob is rotated to its unlocked (non-feeding position), the retract cable 54 is effectively shortened, pivoting the body 30 about the flexures 32 away from the probe shaft 20 and further preventing a driving connection between the know 44 and the probe shaft 20.

Also shown in FIG. 3 are the screw 26 securing the strip 22 to the probe shaft 20 and the guide bearing housing 27 to shich the plate 28 is mounted.

FIG. 3 also illustrates the driving structure between the feed knob 44 and the drive roll 36 including the shaft 42 which extends to the worm assembly 40, which rotates the worm gear 34, driving the shaft 37 mounted to the body 30 by bearings 38. The drive roll 36 is fixed to the shaft 37.

As shown in FIG. 4, the screw 24 is a shoulder screw of such shoulder length as to provide a small clearance for the thickness of drive strip 22 both in its height 22h and its width 22w. Clearance is also provided around the shoulder screw diameter. This allows the drive strip to float pivotally around lower screw 26. This also permits thermal size and expansion differences between varying drive strip 22 and probe shaft (20) materials. The flexures 32 only allow the body 30 movement toward or away from the probe shaft. Straightness variations of drive strip 22 are taken up by the strip float permitted by the clearance around shoulder screw 24.

Of course, many modifications and alterations to the preferred embodiment described in the preceeding paragraphs is possible without departing from the spirit of the present invention. For example, although use of the magnetic force is described and believed to be the most desirable in the present invention, there are many other ways of releasably connecting two members, such as a spring elements, fluids or clutches. Additionally, although a preferred embodiment of the present invention includes a releasable connection accomplished through the movable position of a permanent magnet, in some instances it may be desirable to employ an electromagnet fixed in position and controllably energized, which avoids position changes to apply or remove an attractive magnetic force, but rather could be electrically energized or de-energized to provide a similar magnetic force between the probe shaft and drive member. The controllable electromagnetic force could be varied quite easily to achieve a desired attractive force or to allow a decoupling at predetermined conditions. Additionally, the present invention uses a retracting cable to assist in returning the magnet to its initial position, perhaps in cooperation with a detent mechanism which is described and shown in the present invention. However, such positioning structure and function is by no means unique nor necessary in the present invention, which might employ manual, electrical, servo or gravity repositioning of the "lock" before and after use in its place. Accordingly, the present description of the preferred embodiment should be considered as merely illustrative of the present invention and not in limitation thereof, as the present invention is limited soley by the following claims.

Having thus described the invention, what is claimed is:

1. A coordinate measuring machine of the type including a base, a carriage horizontally movable with respect to said base and supporting a vertically movable probe shaft, means for measuring a part carried on the base of the measuring machine, the improvement wherein said probe has a ferromagnetic drive strip extending along the length thereof and wherein vertical movement of the vertically movable probe is controlled by first and second control means, both of said control means coupled to said carriage, said first control including a magnet and means operable to move the magnet between a first position at which said magnet is closely adjacent to and exerting an attractive force on said drive strip of said probe shaft to a second position displaced away from said drive strip and said second control means being operatively coupled to said probe shaft to be selectively operable to be able to move the probe shaft upward or downward when said magnet is in its first position but not when the magnet is in its second position.

2. A coordinate measuring machine of the type including a base for supporting a workpiece to be measured and a probe shaft coupled to said base to displace vertically a measured amount with respect to said base to affect a measurement, the improvement comprising a drive member selectively operable for moving the probe shaft vertically when said drive member is rotated and means for selectively coupling the drive member to the probe shaft, said probe shaft including a ferromagnetic portion extending along the length thereof and said selective coupling means including a magnetic member movable between two positions, one position adjacent said ferromagnetic portion of said probe shaft to generate a magnetic attractive force, said selective coupling means also including means responsive to said magnetic attractive forces, the drive member coupling the probe shaft to move the probe shaft, the other position of said magnetic member being displaced from said ferromagnetic portion of said probe shaft and by which the drive shaft is decoupled from moving the probe shaft.

3. An apparatus for measuring a workpiece comprising:
   a base adjacent said workpiece;
   a probe for engaging said workpiece and coupled to said base for vertical movement with respect thereto;
   means associated with said base for measuring the position of said probe;
   a feed mechanism for moving said probe including a rotatable knob mounted by linkage to the base and selectively driving a drive member in frictional engagement with the probe, whereby when the knob is rotated, the linkage drives the drive member to move the probe vertically in a direction based upon the direction of rotation; and
   a lock mechanism for selectively coupling and decoupling the feed mechanism to said probe, said lock mechanism including a magnet coupled to the base and movable between a first position adjacent to the probe, said probe having a ferrogmagnetic portion extending along the length thereof and closely spaced from said magnet with said magnet in said first position to generate an attractive force therebetween, said lock mechanism including means acting on the feed mechanism to thereby be coupled so that the drive member is able to move the probe; said magnet movable from said first position to a second position removed from the probe ferromagnetic portion sufficiently so that said magnetic attractive force is not generated sufficiently so that the feed mechanism is not coupled to drive the probe.

4. A measuring apparatus of the type described in claim 3 wherein the member in frictional engagement with the probe is a flanged wheel having a "V" shape including converging surfaces engaging in driving relationship said portion of said probe when the lock mechanism couples the feed mechanism to the probe.

5. A measuring apparatus of the type described in claim 3 wherein the mounting between the feed mechanism and the base includes a laterally adjustable connection to facilitate an inaccurate initial positioning between the drive member and the probe and to facilitate any misalignment between the drive member and the probe without affecting the driving connection therebetween.

6. A measuring apparatus of the type described in claim 3 wherein said magnet is mounted for rotation about an axis offset therefrom to be movable between said first and said second positions.

7. A measuring apparatus of the type described in claim 6 wherein said feed mechanism includes a drive roller frictionally engaged with said probe ferromagnetic portion, with said magnet in said first position and by the action of said attractive magnetic force.

8. A measuring apparatus of the type described in claim 7 wherein said lock mechanism includes a body carrying said drive roller and said magnet, said body pivotable towards and away from said probe to carry said drive roller into and out of engagement therewith.

9. A measuring apparatus of the type described in claim 8 wherein said magnet in said first position is spaced slightly from said ferromagnetic portion with said drive roller in engagement therewith.

10. The measuring apparatus of the type described in claim 8 including a retract means moving said body away from said probe upon movement of said magnet from said first to said second position.

11. The measuring apparatus of the type described in claim 10 wherein said retract means includes a cable and means shortening said cable by movement of said magnet from said first to said second position.

12. A coordinate measuring machine of the type including a base, a carriage horizontally movable with respect to said base and supporting a vertically movable probe shaft, means for measuring a part carried on the base of the measuring machine, the improvement wherein said probe has a ferromagnetic drive strip extending along the length thereof and wherein vertical movement of the vertically movable probe is controlled by first and second control means, both of said control means coupled to said carriage, said first control including a ferromagnetic member and means operable to selectively cause said ferromagnetic member to exert an attractive force on said drive strip of said probe shaft, and said second control means being operatively coupled to said probe shaft to be selectively operable to be able to move the probe shaft upward or downward when said magnetic force is generated, but not when said magnetic force is not generated.

* * * * *